Nov. 28, 1950         S. KONIKOFF         2,531,573
                    ROTARY SAFETY DRIVE
Filed March 14, 1946                 2 Sheets-Sheet 1
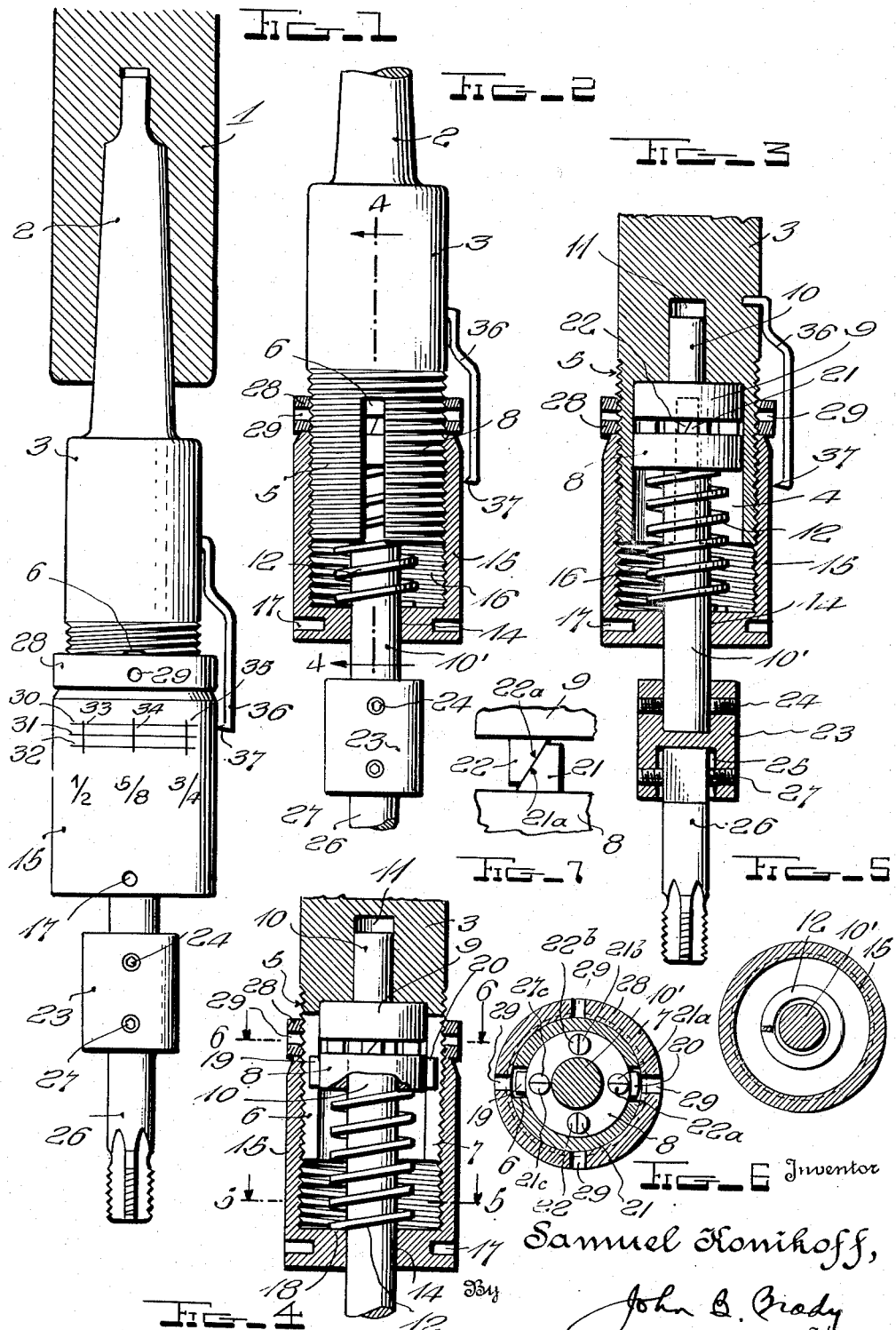

Nov. 28, 1950  S. KONIKOFF  2,531,573
ROTARY SAFETY DRIVE
Filed March 14, 1946  2 Sheets-Sheet 2
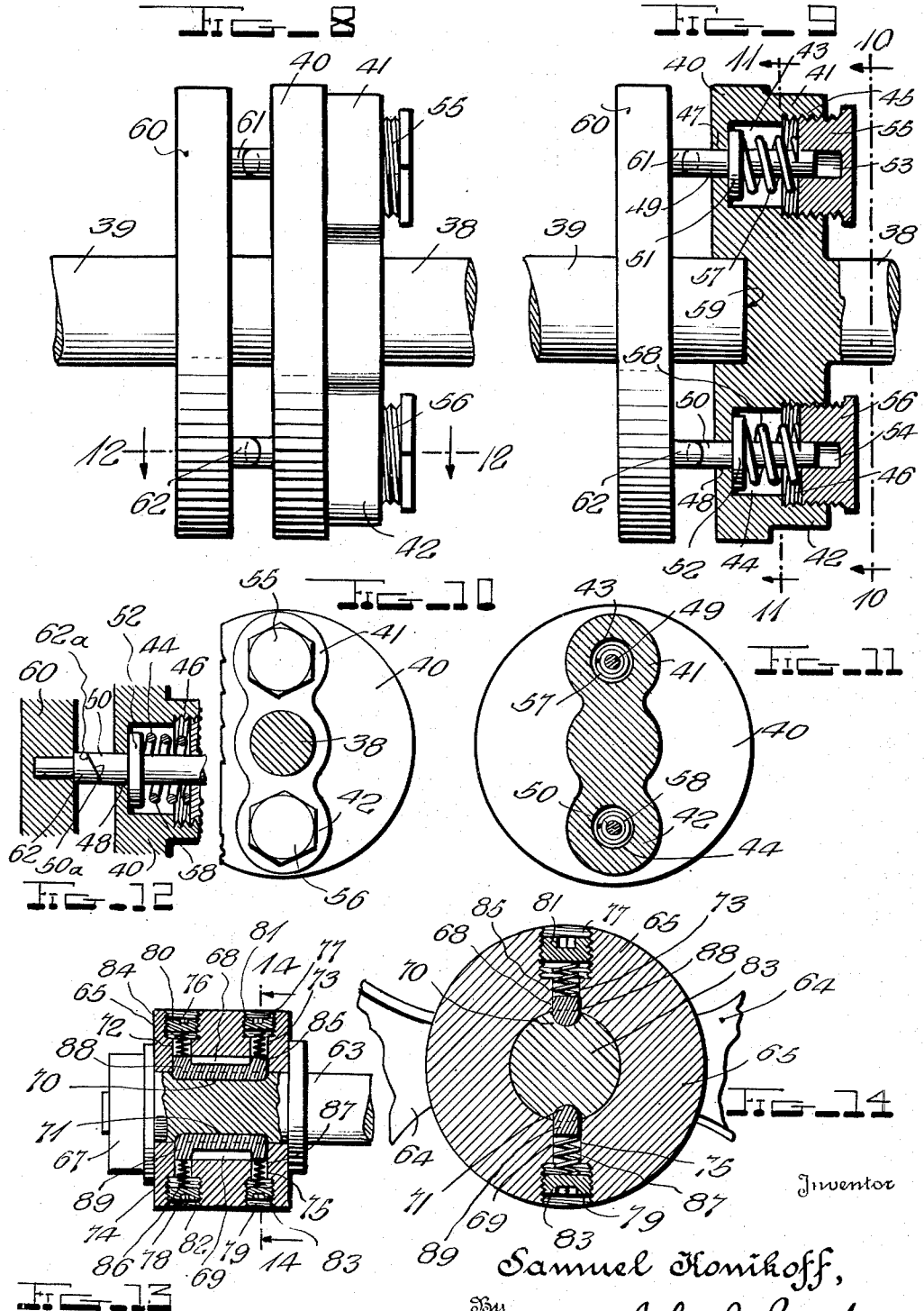
Inventor
Samuel Konikoff,
By John B. Brady
Attorney Patented Nov. 28, 1950

2,531,573

UNITED STATES PATENT OFFICE 2,531,573

ROTARY SAFETY DRIVE

Samuel Konikoff, Pottstown, Pa.

Application March 14, 1946, Serial No. 654,393

2 Claims. (Cl. 64—29)

My invention relates broadly to rotary drives and more particularly to a construction of rotary drive having built-in protective features for preventing injurious strains from being transmitted from a driven member to a driving member.

One of the objects of my invention is to provide construction of torque protective mechanism for rotary drives including means for preventing the transmission of forces under conditions of overload, thereby preventing injurious strains upon any moving part of the mechanism.

Another object of my invention is to provide a construction of calibrated rotary drive, by which the transmission torque through the drive may be predetermined and the drive rendered inoperative when the limit of the safe driving torque is reached.

Still another object of my invention is to provide a rotary drive including a protective mechanism for predetermining the driving torque which may be safely transmitted through the mechanism with means for interrupting the transmission of driving forces under conditions of injurious overloading.

A still further object of my invention is to provide a construction of rotatable shaft system having means interposed in the shaft system between a driven shaft and a driving shaft for interrupting the continued application of driving torque to the driven shaft under conditions of abnormal obstruction to the driven shaft.

Other and further objects of my invention reside in a construction of boring head for rotary tools containing built-in protective mechanism for preventing the continuous application of driving force to the tool under conditions in which objects may arrest the normal rotation of the tool as set forth more fully in the specification hereinafter following by reference to the accompanying drawings, in which:

Figure 1 is an elevational view of a boring head to which the safety mechanism of my invention is applied; Fig. 2 is a view of the boring head with parts illustrated in vertical section for more clearly showing the arrangement of the protective mechanism of my invention; Fig. 3 is a vertical sectional view taken through the boring head and illustrating the co-action of the parts for transmitting a normal driving torque from the driving member to the driven member; Fig. 4 is a vertical sectional view through the boring head taken on line 4—4 of Fig. 2 and illustrating the manner in which the driven member is maintained in co-axial alignment with the driving member; Fig. 5 is a transverse sectional view taken on line 5—5 of Fig. 4; Fig. 6 is a transverse sectional view taken on line 6—6 of Fig. 4; Fig. 7 is a detailed view showing the manner in which coacting cam members carried by the driving and driven members operate in carrying out the functions of the protective mechanism of my invention; Fig. 8 shows the application of my invention to a protective mechanism interposed between the driving and driven elements of the rotatable shaft system; Fig. 9 is a view similar to the view shown in Fig. 8 but illustrating the driving member of the rotary drive system in vertical section; Fig. 10 is a transverse sectional view taken on line 10—10 of Fig. 9 and illustrating the adjusting means of the protective mechanism in end elevation; Fig. 11 is a transverse sectional view taken on line 11—11 of Fig. 9; Fig. 12 is a fragmentary horizontal sectional view through the protective mechanism on line 12—12 of Fig. 8; Fig. 13 is a fragmentary sectional view through the hub of a propeller and a propulsion shaft connected therewith showing the principles of my invention applied thereto; and Fig. 14 is a transverse sectional view on a somewhat enlarged scale taken on line 14—14 of Fig. 13.

Referring to the drawings in detail, reference character 1 designates a rotatably driven chuck in which the shank 2 of a boring head 3 is secured and by which the boring head 3 is adapted to be rotatably driven. Boring head 3 terminates in a cylindrical sleeve 4 which is externally screw-threaded as represented at 5. The sleeve 4 is longitudinally slotted at diametrically opposite sides as shown at 6 and 7. The diametrically opposite slots 6 and 7 serve as opposed guides for controlling the movement of annular head 8 with respect to a coacting head 9 which is carried by the shaft 10 which enters socket 11 extending internally and axially into the boring head 3 as shown. The opposite end of shaft 10 is slightly enlarged as represented at 10' and it passes through the head 8 and through the tensioned coil spring 12 and through the end aperture 14 in the cylindrical cap 15. The cylindrical cap 15 is internally screw-threaded as represented at 16 to engage over the external screw-threads 5 on cylindrical sleeve 4 for adjustment thereon. The cylindrical cap 15 contains a multiplicity of radially disposed sockets 17 for engagement by a tool to facilitate the adjustment thereof over the screw-threaded sleeve 4.

The internal head 18 of the cylindrical cap 15 serves to engage the end of the tensioned coil spring 12 and urges this into engagement with the head 8. The head 9 is in the form of a ring member which is slidable over the shaft 10' against the action of the tensioned coil spring 12. The head 8 has a pair of oppositely projecting radially extending lugs 19 and 20 thereon which slidably engage the longitudinally extending diametrically opposed slots 6 and 7 of the screw-threaded sleve 4. Displacement of the annular head 8 is resisted by the action of the tension coil spring 12 which tends to urge annular head 8 in the direction of the coacting head 9 which is attached to shaft 10. The heads 8 and 9 each have such diameter that these heads engage snugly within the internal diameter of the screw-threaded sleeve 4. The head 9 occupies a limiting position adjacent the extremity of the hollow screw-threaded sleeve 4, whereas, head 8 tends to advance toward or retract from the head 9. These two members, 8 and 9, serve as mounting means for pairs of coacting cam members, one set of which has been illustrated more clearly in Fig. 7 at 21 and 22. Cam member 21 extends vertically from the upper face of ring member 8, whereas, cam 22 depends downwardly from member 9. The abutting faces of the cam members are formed on an angle of approximately 60° so that cam faces 21a and 22a normally establish driving abutment one with another tending to transmit rotary driving torque from head 9 to head 8. A similar set of cam members is provided either in a diametrically opposite position on members 8 and 9 or at quadrantal positions on members 8 and 9 as represented at 21a and 22a, 21b and 22b, and 21c and 22c in Fig. 6. Shaft 10' projects beyond the cylindrical cap member 14 and is engaged by means of a suitable coupling member 23 which is secured thereto by suitable set screws represented at 24. Coupling member 23 includes a socket-like recess 25 therein for receiving the shank of a suitable tool such as a drill or a tap as shown at 26. The tap which is illustrated has the shank thereof secured to coupling member 23 by means of suitable set screws 27 as indicated.

Rotary movement is imparted to the tool or tap 26 from the chuck 1 through the shank 2 of boring head 3 to the ring member 8. Ring member 8 is provided with sets of cam members 21, 21a, 21b and 21c, which project upwardly into the path of coacting cam members 22, 22a, 22b and 22c carried by member 9. Coil spring 12, which is compressed by cylindrical cap 15 toward the slidable annular member 8 tends to maintain the sets of cam faces in abutting relation. However, conditions of abnormal obstruction at the location of the tap 26 tends to block continuous rotation of shaft 10'. The driving torque, however, is constant, although the shaft 10' has slowed down. The result is that mutual movement occurs between the sets of cam faces resulting in the displacement of the members 8 and 9 to a sufficient extent to allow the required protective yielding movement to prevent injury to the tap 26 or the work. Such protection may extend through an entire quadrant, in which event the cam members are displaced to the extent of their entire depth and progress to the next succeeding stop position for a repetition of the protective action.

In order to fix the limits of protection afforded by the mechanism of my invention, I provide a stop ring 28 which is internally screw-threaded to engage the external screw-threads 5 on the cylindrical sleeve 4. Prior to each setting of the mechanism for a particular size tap or drill the stop ring is backed off on the screw threads of the sleeve 5 to enable the sleeve 15 to be adjusted to desired position. Then the ring 28 is screwed back to a position in which sleeve 15 establishes locked engagement therewith. Radially extending tool-engaging sockets 29 are provided in the ring 28 to permit adjustment of the ring 28 to a position in which cylindrical sleeve 15 may be moved to a locking abutment therewith.

The external surface of cylindrical cap 15 is calibrated by a combination of horizontally extending calibrations represented at 30, 31 and 32 in Fig. 1, and a coacting set of vertical calibrations 33, 34 and 35 with graduations associated therewith; such as, ½, ⅝, ¾, etc. representing the required protective tension to be provided in the mechanism of the boring head for correspondingly sized drills or taps. As indicator arm 36 extends from the boring head 3 terminating in a pointer 37 which registers with the aforesaid calibrations, thereby permitting the convenient setting and adjustment of the mechanism to provide the proper protection for a predetermined size of tool. Thus, the cylindrical cap 15 may be revolved to bring a particular graduation into alignment with pointer 37 for a particular size tool mounted in socket 25. When thus set, driving member 3 will continue to rotate the driven member 10' until the torque pressure rises to a dangerous condition, whereupon, slippage will occur between coacting members 8 and 9, relieving the tool and work from sustained dangerous torque pressure.

The principles of my invention may be applied to any system of driving and driven shafts, as represented in Figs. 8–12 wherein the driving shaft is designated by reference character 38 and the driven shaft is represented by reference character 39. The driving shaft 38 is provided with a flange member 40 from which there extends symmetrical integrally connected housing portions 41 and 42. The housing portions 41 and 42 are arranged in diametrically opposite positions on opposite sides of the driving shaft 38 and are each provided with socket-like recesses 43 and 44 which terminate in internally screw-threaded portions 45 and 46. The socket portions 43 and 44 are each centrally apertured at 47 and 48 through the face of the flange 40 for the passage of longitudinally retractable pin members 49 and 50. The retractable pin members 49 and 50 extend through the socket recesses 43 and are provided with flanges 51 and 52 thereon and have end portions which slidably extend into sockets 53 and 54 carrying screw-threaded adjustable heads 55 and 56. The screw-threaded adjustable heads 55 and 56 engage the internal screw-threads in the screw-threaded portions 45 and 46 of the sockets 43 and 44. Coil springs 57 and 58 are interposed between flange 51 and adjustable head 55 and between flange 52 and adjustable head 56 respectively. Thus, various degrees of pressure may be exerted against coil springs 57 and 58 for resisting longitudinal displacement of pins 49 and 50.

The flange 40 is centrally recessed at 59 for the entry and journaling of the end of driven shaft 39. The driven shaft 39 carries a flange 60 spaced from the end thereof in a plane substantially parallel with the plane of flange 40 on shaft 38. Flange 60 carries a pair of pin members 61 and 62 which are normally aligned with the co-acting pin members 49 and 50 carried by flange 40. The faces of pin members 61 and 62 and pin members 49 and 50 are provided with complementary cams as represented, for example, in Fig. 12 in which cam face 62a normally abuts cam face 50a on the pins 62 and 50, respectively. These cam faces may be formed on an angle of approximately 45° and normally establish such abutting relation that a rotative force from the driving shaft 38 is transferred as a driving torque to driven shaft 39. However, under conditions where an obstruction may slow down or preclude the rotation of shaft 39, shaft 38 continues to exert a constant driving force, whereupon, slippage occurs between the came faces on pins 49 and 50 with respect to the cam faces on pins 61 and 62 and dangerous or excessive driving torque is not transmitted to the driven shaft 39.

I have disclosed two sets of pairs of coacting pins but it will be understood that a multiplicity of sets; such as, four or more pairs of pins, may be employed for insuring the transmission of the required driving force from the driving shaft 38 to the driven shaft 39. The yield point at which excessive driving force is no longer impressed upon the driven shaft is controlled by adjustment of the adjustable heads 55 and 56.

My invention is also applicable to propulsion systems, as shown, for example, in Figs. 13 and 14. The propeller shaft is represented at 63, which is driven from the propulsion machinery for normally driving the propeller 64 carried by hub 65 which is secured to shaft 63 between flange member 66 and the end nut 67. The hub 65 is provided with pairs of diametrically arranged slots 68 and 69 extending longitudinally of the hub 65 and normally alignable with longitudinally extending grooves 70 and 71 in the shaft 63. The slots 68 and 69 in the hub 65 terminate at opposite ends in sockets 72, 73, 74 and 75, respectively. These sockets are enlarged at their extremities and internally screw-threaded as represented at 76, 77, 78, and 79, respectively. The screw-threaded sockets are each engaged by rotatably adjustable screw-threaded plugs 80, 81, 82 and 83, respectively. These adjustable plugs confine and bear upon coil springs 84, 85, 86 and 87 respectively, which exert variable pressure upon opposite ends of the longitudinally extending keys 88 and 89, respectively. The longitudinally extending keys 88 and 89 operate in the coacting aligned grooves 70 and 68, and 71 and 69, respectively. The longitudinally extending keys 88 and 89 normally lock the propeller hub 65 with the propeller drive shaft 63 for all normal conditions of turn torque. However, under conditions of excessive obstruction against propeller 64 developing forces normally injurious to the structure of a propeller, the floating keys 88 and 89 are forced out of the grooves 70 and 71 of shaft 63 and into the aligned slots 68 and 69 in propeller hub 65 against the pressure of coil springs 84, 85, 86 and 87, allowing the drive shaft 63 to turn freely within the propeller hub 65 until the condition of obstruction is removed from the propeller 64 or lessened below a safe value.

While I have described my invention in certain of its preferred embodiments, I realize that modifications may be made in the detail of construction and in the applications of my invention and I desire that it be understood that no limitations upon my invention are intended other than may be imposed by the scope of the appended claims.

What I claim as new and desire to secure by Letters Patent of the United States is as follows:

1. A boring head comprising in combination a driving member and a driven member associated therewith, said driving member having an externally screw-threaded cylindrical housing extending therefrom said driven member including a shaft projecting through said cylindrical housing and axially and slidably into a socket in the end of said driving member, said shaft carrying a flange thereon, a coacting flange adjacent the aforesaid flange concentrically disposed around said shaft and slidably and rotatably movable with respect thereto, cam members carried by the adjacent faces of said flanges, a spring for normally urging said last-mentioned flange towards said first-mentioned flange for normally maintaining coacting abutting relation between said cam members, means for confining said last mentioned flange for limited translatory movement with respect to said first mentioned flange and means surrounding said shaft and engaging said externally screw-threaded cylindrical housing and adjustable thereon for variably controlling the effective pressure of said spring for permitting mutual release of said cam members under conditions of excessive rise in resistance at said driven member to the turning torque imparted thereto by said driving member.

2. A boring head comprising in combination a driving member and a driven member associated therewith, said driving member having an externally screw-threaded cylindrical housing extending therefrom said driven member including a shaft projecting through said cylindrical housing and axially and slidably into a socket in the end of said driving member, said shaft carrying a flange thereon, a coacting flange adjacent the aforesaid flange concentrically disposed around said shaft and slidably and rotatably movable with respect thereto, cam members carried by the adjacent faces of said flanges, a spring for normally urging said last-mentioned flange towards said first-mentioned flange for normally maintaining coacting abutting relation between said cam members, means for confining said last mentioned flange for limited translatory movement with respect to said first mentioned flange means surrounding said shaft and engaging said externally screw-threaded cylindrical housing and adjustable thereon for variably controlling the effective pressure of said spring for permitting mutual release of said cam members under conditions of excessive rise in resistance at said driven member to the turning torque imparted thereto by said driving member, calibration for pre-setting said spring means to predetermined effective values of tension for correspondingly determining the torque point at which the transmission of driving torque from said driving member to said driven member is interrupted, and a screw-threaded stop ring adjustable on the external screw threads of said cylindrical housing and forming an abutment for limiting the adjustment of said means.

SAMUEL KONIKOFF.

REFERENCES CITED

The following references are of record in the file of this patent:

UNITED STATES PATENTS

| Number | Name | Date |
|---|---|---|
| 857,632 | Kihlgren | June 25, 1907 |
| 1,126,219 | Hupp | Jan. 26, 1915 |
| 1,881,633 | Johnson | Oct. 11, 1932 |
| 2,164,870 | De Salardi | July 4, 1939 |
| 2,275,004 | Behl | Mar. 3, 1942 |

FOREIGN PATENTS

| Number | Country | Date |
|---|---|---|
| 89,743 | Sweden | of 1937 |